Oct. 7, 1952                 O. G. KAASA               2,613,173
PROCESS FOR THE CATALYTIC CONVERSION OF HYDROCARBONS AND THE
STRIPPING OF THE FOULED CATALYST PARTICLES WITH STEAM
Filed April 30, 1947
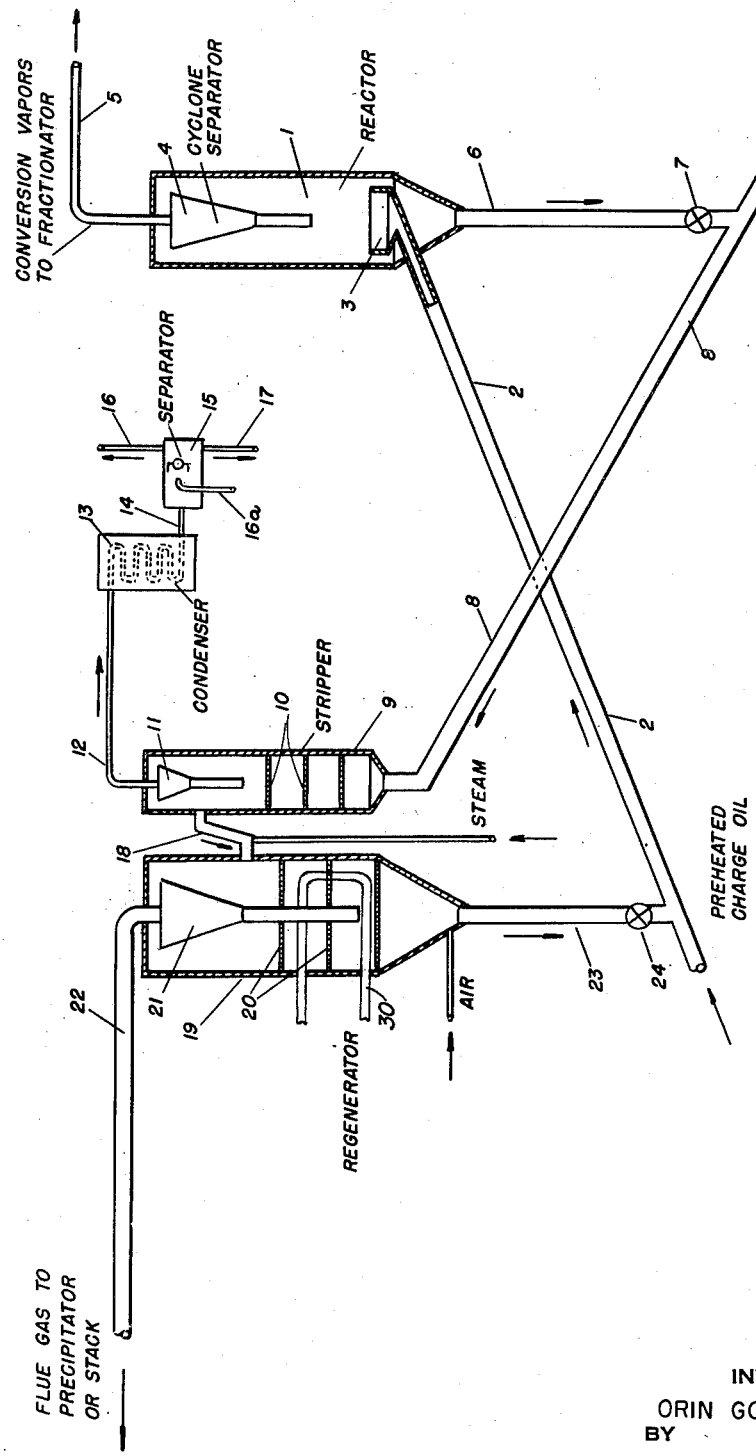
INVENTOR
ORIN GORDON KAASA
BY
Pennie, Edmonds, Morton & Barrows.
ATTORNEYS Patented Oct. 7, 1952

2,613,173

UNITED STATES PATENT OFFICE 2,613,173

PROCESS FOR THE CATALYTIC CONVERSION OF HYDROCARBONS AND THE STRIPPING OF THE FOULED CATALYST PARTICLES WITH STEAM

Orin G. Kaasa, Highland, Ind., assignor to Sinclair Refining Company, New York, N. Y., a corporation of Maine Application April 30, 1947, Serial No. 745,042

3 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reactor in which conversion of the oil occurs, and in which the spent catalyst is separated from the oil vapors, the separated catalyst stripped of oil, regenerated by burning off coke or carbon deposited thereon and the regenerated catalyst again suspended in the stream of oil vapors passing to the reactor.

Operations of the type described are commonly designated fluid catalyst processes. In conventional operation, the spent catalyst passes from the bottom of the reactor through a stripper column, extending downwardly from the lower end of the reactor and in which the catalyst is contacted with steam for the purpose of removing or stripping from the catalyst oil remaining thereon. The steam used for stripping, together with the stripped oil vapors, normally passes upwardly from the stripper column into the reactor. The stripped catalyst passes from the bottom of the stripper and is picked up by a stream of air and conveyed thereby into the bottom of the regenerator.

It has been found that the presence of steam in the reactor detrimentally affects the activity and life of the catalyst. Further, contact by air with the catalyst before the latter has been thoroughly stripped of oil results in a loss of oil through burning and frequently an over-burning of the catalyst itself.

In accordance with my present invention the danger of over-burning the catalyst is minimized and also the detrimental affect of steam in the reactor may be avoided with a resultant higher catalystic activity and longer catalyst life.

In previously proposed processes of this type the spent catalyst has been conveyed to the regenerator in suspension in air or other oxidizing gases used for burning the coke or carbon from the catalyst in the regenerator. Upon contact with the oxidizing gases the burning of the carbon or hydrocarbon on the catalyst has been initiated and frequently, in conventional practice, considerable combustion has occurred in the conduit through which the spent catalyst passes to the regenerator.

In conventional regenerators means are provided for controlling the rate of combustion and the maximum temperature of the catalyst, for instance, by extracting heat from the burning zone either by passing a cooling medium through the zone or by withdrawing a portion of the catalyst from the burning zone, cooling it and returning it to the burning zone.

However, combustion occurring in the conduit cannot readily be controlled by such means and the use of regenerating gases for conveying the catalyst to the regenerator has frequently resulted in an over-burning of the catalyst, or a portion thereof, before reaching the regenerating zone, causing a degeneration of the over-all catalyst life and activity.

This difficulty is avoided in my present invention by the use of steam or other non-oxidizing gases or vapors as the conveying medium.

Further, the detrimental affect of steam in the reactor is advantageously avoided by effecting the stripping of the catalyst in a zone entirely separate from the reaction zone and preventing any passage to the reaction zone of steam from the stripper. The spent catalyst passing from the reaction zone is, with advantage, conveyed in gaseous suspension to a stripping zone in which the catalyst is stripped of vaporizable hydrocarbon and passes therefrom by gravity directly to the regenerating zone.

The invention provides an improved process adapted to continuous operation and comprising a plurality of cooperating steps so coordinated as to constitute a unitary operation in which a charge of catalyst is repeatedly used and intermittently regenerated and returned to the reaction zone, and in which loss of catalyst life or activity due to over-burning in transit to the regenerator is avoided.

These and other advantages derived from my invention will appear from the following detailed description of its application to a fluid catalyst cracking operation, with reference to the accompanying drawing which represents conventionally and diagrammatically a flow diagram of such operation.

Referring more particularly to that embodiment of my invention shown in the accompanying drawing, the apparatus indicated by the reference numeral 1 is a generally cylindrical reactor of conventional type. The finely divided catalyst suspended in oil vapor enters the reactor through conduit 2, extending into the reactor and terminating in a conical member 3 of somewhat smaller diameter than the reactor and opening into the reactor through a conventional grid. As the hot vapors pass upwardly through the reactor there is a tendency for the catalyst to drop out of suspension forming a so-called "high density" or "dense phase" body of fluidized catalyst in the reactor which flows downwardly through the annular space between the member 3 and the walls of the reactor.

The vapors, product of the conversion, rise to the top of the reactor, pass through a cyclone type separator 4 to remove suspended catalyst from the vapors, the latter passing therefrom through conduit 5 to fractionating apparatus, not shown, the separated catalyst dropping back into the dense phase bed of catalyst in the reactor.

The spent catalyst passes from the bottom of the reactor through the spent catalyst leg 6, advantageously of sufficient length that the dense body of catalyst therein forms an effective seal against the upward passage of steam into the reactor and in which there is interposed a conventional type valve arrangement indicated at 7 for controlling the downward flow of the catalyst, advantageously of the slide valve type. From thence, the spent catalyst flows into the conduit 8 where it is picked up by a current of steam and carried up into the bottom of the stripper 9.

Oil is partially stripped from the catalyst in transit to the stripper in suspension in the steam and further stripping is thereafter effected in the stripper. The stripper 9 is provided with a plurality of baffles or perforated partitions 10 adapted to retard the passage of the catalyst upwardly through the stripper, to promote uniform and prolonged contact between the catalyst and the steam supplied through conduit 8 and to minimize top-to-bottom mixing.

The catalyst is thus effectively stripped by contact with the steam and the steam and stripped hydrocarbon vapors pass from the top of the stripper through a cyclone type separator 11 for separation of suspended catalyst and out through conduit 12 to condenser 13 in which the steam and heavier hydrocarbons are condensed and from which the resultant water and hydrocarbons pass through conduit 14 to separator 15. The uncondensed hydrocarbons pass from the separator through line 16 to plant gas system, and the condensed hydrocarbons returned to the system for further treatment or passed to storage through line 16a. The separated water is withdrawn from the separator through line 17.

The steam passing upwardly through the stripper strips from the catalyst the major portion of vaporizable hydrocarbons contained therein and carries the catalyst upwardly through the stripper. A relatively dense fluid bed of the catalyst accumulates in the stripper and overflows therefrom through conduit 18 into the regenerator 19. A further amount of steam may be injected into the lower end of conduit 18 so as to flow upwardly through the conduit countercurrent to the downcoming catalyst, by which further stripping of the catalyst is accomplished. The steam and stripped hydrocarbon from this auxiliary stripping pass into stripper 9 and the catalyst flows by gravity into the upper part of the regenerator.

The regenerator 19 is advantageously provided with baffles or perforated partitions 20 designed to retard the downward passage of the catalyst, to promote uniform and prolonged contact with air introduced into the lower part of the regenerator and to minimize top-to-bottom mixing. Upon contact of the air with the hot catalyst, the coke or carbon and any residual hydrocarbons on the catalyst are burned as the catalyst moves gradually downwardly through the regenerator. The oxygen of the air is gradually consumed as it passes upwardly through the catalyst, the air richest in oxygen coming in contact only with catalyst which has been partially freed of carbon and therefore is lean in oxidizable material. The gases upon reaching the top of the catalyst bed are substantially free from uncombined oxygen and serve more completely to strip from the catalyst any remaining vaporizable hydrocarbons thus reducing the amount of burning required in regeneration of the catalyst.

From the upper part of the regenerator the hot products of combustion pass through cyclone separator 21 and out through conduit 22 to a precipitator or stack, not shown. The catalyst gravitates downwardly forming a relatively dense fluidized bed of catalyst in the regenerator and passes downwardly therefrom through the regenerated catalyst leg 23 which, similar to leg 6, should be of sufficient length that the dense body of catalyst therein forms an effective seal against the upward passage of vapors or gases therethrough. A valve 24 of conventional type, for instance, a slide valve, is interposed in leg 23 to control the downward passage of the catalyst. From leg 23 the regenerated catalyst flows into conduit 2 where it is picked up by the oil charge and returned to the reactor.

In the regenerator illustrated, the combustion rate is effectively controlled to a major extent by the countercurrent flow of the catalyst and air and the arrangement whereby top-to-bottom mixing of the catalyst is, to a major extent, prevented. Danger of localized overheating of the catalyst is thereby greatly reduced. In regenerators of the conventional type it is customary practice to provide means for extracting excess heat from the catalyst being regenerated to avoid overheating of the catalyst. Similar means, such as the cooling coil 30, may be provided if desirable in the particular regenerator illustrated.

The amount of air passed through the regenerator for burning the carbon or coke deposit from the catalyst is with advantage so regulated that the oxygen thereof is substantially completely consumed in passing upwardly through the catalyst so that the hot flue gases reaching the top of the catalyst bed are substantially free from uncombined oxygen, as previously noted.

Instead of using steam as the conveying medium for the spent catalyst, other non-oxidizing gases may be employed. Steam has been used with advantage because of its effectiveness in stripping hydrocarbons from the spent catalyst. It is frequently permissible to use for this purpose a mixture of steam and air provided the proportion of air admixed with the steam is kept sufficiently low to avoid a mixture which under the existing time and temperature conditions would cause a detrimental temperature rise in the catalyst during transit or in the stripper.

The catalyst employed may be of the type conventionally used in fluid catalyst processes, for instance a silica-alumina type catalyst in finely divided or powdered form. The conditions in the reactor may likewise be those conventionally used in operations of this type and, as understood by the art, optimum temperatures and pressures will depend primarily upon the type of feed stock used, the particular catalyst employed and the reaction desired. The present invention is applicable to operations of the type described regardless of the particular reaction and reaction conditions.

In cracking gas oil, for instance, the reaction temperature may with advantage be within the range of 800 to 1,000° F. and the pressure at the top of the reactor within the range of about 5 to 25 pounds per square inch. The regenerator temperature may be within the range of say 950° to 1,200° F., depending upon the particular catalyst employed, but should not exceed that at which the catalyst is detrimentally affected.

As previously noted, my invention is not limited to the particular embodiment therein described but is applicable to various modifications of fluid catalyst processes.

I claim:

1. In the fluid catalyst process for the conversion of hydrocarbons wherein dense phase bodies of the fluidized catalyst are maintained in a reaction zone and in a regenerating zone, respectively, the catalyst is continuously regenerated in the regenerating zone by contact with air under conditions adapted to avoid excessive rise in temperature, regenerated catalyst is withdrawn from the body of the catalyst in the regenerating zone, suspended in oil vapors and conveyed thereby to the reaction zone, catalyst is continuously withdrawn from the body of catalyst in the reaction zone, stripped of oil in a stripping zone by contact with a steam stripping medium and returned to a body of catalyst in the regenerating zone, the improvement which comprises withdrawing catalyst by gravity from a lower portion of the body of catalyst in the reaction zone, suspending the withdrawn, substantially unstripped catalyst in a steam stream and conveying it thereby upwardly to the lower portion of a stripping zone separate from the reaction zone, positioned at an elevation such that the body of catalyst therein extends to an elevation higher than the upper surface of the body of catalyst in the regenerating zone and is in a relatively dense phase and from which the passing of stripping steam to the reaction zone is prevented, stripping the catalyst in the stripping zone by passing the steam conveying medium upwardly through the dense phase catalyst in this zone, passing the stripped catalyst by gravity from the stripping zone to the upper portion of the dense phase body of catalyst in the regenerating zone, introducing steam into the catalyst as it passes from the stripping zone to the regenerating zone to effect a seal for preventing regeneration gases from passing into the stripping zone, and passing regeneration air upwardly through the body of catalyst in the regenerating zone, whereby substantial burning of the carbonaceous deposit from the catalyst in transit from the reaction zone to the zone of regeneration is avoided.

2. The process of claim 1 in which heat is extracted from the catalyst undergoing regeneration to avoid excessive rise in temperature.

3. The process of claim 1 in which the regeneration air is supplied at a rate such that the free oxygen thereof is substantially consumed before reaching the point of introduction of the catalyst from the stripping zone.

ORIN G. KAASA.

REFERENCES CITED

The following references are of record in the file of this patent:

UNITED STATES PATENTS

| Number | Name | Date |
|---|---|---|
| 2,369,523 | Belchetz | Feb. 13, 1945 |
| 2,395,106 | Day et al. | Feb. 19, 1946 |
| 2,414,474 | Gerhold | Jan. 14, 1947 |
| 2,414,852 | Burnside et al | Jan. 28, 1947 |
| 2,425,807 | Jahnig | Aug. 19, 1947 |
| 2,447,116 | Collins | Aug. 17, 1948 |
| 2,448,135 | Becker et al. | Aug. 31, 1948 |
| 2,450,724 | Grote | Oct. 5, 1948 |
| 2,465,255 | Moorman | Mar. 22, 1949 |

FOREIGN PATENTS

| Number | Country | Date |
|---|---|---|
| 554,227 | Great Britain | June 25, 1943 |